(12) United States Patent
Chatterjee et al.

(10) Patent No.: US 10,055,354 B1
(45) Date of Patent: Aug. 21, 2018

(54) SYSTEMS, DEVICES AND METHODS USING A SOLID STATE DEVICE AS A CACHING MEDIUM WITH A HASHING ALGORITHM TO MAINTAIN SIBLING PROXIMITY

(71) Applicant: American Megatrends, Inc., Norcross, GA (US)

(72) Inventors: Paresh Chatterjee, Fremont, CA (US); Srikumar Subramanian, Suwanee, GA (US); Narayanaswami Ganapathy, Newark, CA (US); Venugopalreddy Mallavaram, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 15/145,874

(22) Filed: May 4, 2016

Related U.S. Application Data

(60) Provisional application No. 62/158,052, filed on May 7, 2015.

(51) Int. Cl.
*G06F 12/08* (2016.01)
*G06F 3/06* (2006.01)
*G06F 12/0873* (2016.01)
*G06F 12/122* (2016.01)
*G06F 12/128* (2016.01)

(52) U.S. Cl.
CPC ........ *G06F 12/0873* (2013.01); *G06F 3/0619* (2013.01); *G06F 3/0665* (2013.01); *G06F 3/0689* (2013.01); *G06F 12/122* (2013.01); *G06F 12/128* (2013.01); *G06F 2212/604* (2013.01); *G06F 2212/69* (2013.01)

(58) Field of Classification Search
CPC .. G06F 3/0619; G06F 3/0689; G06F 12/0873; G06F 2212/604; G06F 3/0665; G06F 12/122; G06F 12/128; G06F 2212/69
USPC ......................................................... 711/113
See application file for complete search history.

(56) References Cited

U.S. PATENT DOCUMENTS

| 4,989,131 | A | 1/1991 | Stone |
| 5,499,337 | A | 3/1996 | Gordon |
| 5,680,579 | A | 10/1997 | Young et al. |

(Continued)

OTHER PUBLICATIONS

Co-pending U.S. Appl. No. 15/145,084, filed May 3, 2016.

(Continued)

*Primary Examiner* — Jasmine Song
(74) *Attorney, Agent, or Firm* — Meunier Carlin & Curfman LLC (57) ABSTRACT

A method for managing a caching medium for a storage system includes providing an SSD cache including a plurality of cache lines, providing a data structure including a plurality of buckets for managing the SSD cache, and providing a plurality of cache headers for managing the cache lines. Each cache line has a first predetermined size, and each bucket corresponds to a contiguous region of a physical storage capacity having a second predetermined size. Each cache header associates a cache line and a corresponding data block stored in the data storage system. The method also includes assigning two or more cache headers for cache lines associated with corresponding data blocks stored in a same contiguous region of the physical storage capacity to a same bucket, and maintaining the two or more cache headers as a first group of cache headers within the same bucket.

17 Claims, 6 Drawing Sheets

(56) References Cited

U.S. PATENT DOCUMENTS

| | | |
|---|---|---|
| 5,732,240 A | 3/1998 | Caccavale |
| 5,799,324 A | 8/1998 | McNutt et al. |
| 5,802,561 A | 9/1998 | Fava et al. |
| 5,892,937 A | 4/1999 | Caccavale |
| 6,175,900 B1 | 1/2001 | Forin et al. |
| 6,490,578 B1 | 12/2002 | Burkhard |
| 6,523,102 B1 | 2/2003 | Dye et al. |
| 6,553,511 B1 | 4/2003 | DeKoning et al. |
| 6,606,629 B1 | 8/2003 | DeKoning et al. |
| 6,651,153 B1 | 11/2003 | Orfali |
| 7,177,850 B2 | 2/2007 | Argenton et al. |
| 7,257,684 B1 | 8/2007 | Sinha et al. |
| 8,219,724 B1 | 7/2012 | Caruso et al. |
| 8,572,736 B2 | 10/2013 | Lin |
| 8,631,472 B1 | 1/2014 | Martin et al. |
| 8,775,741 B1 | 7/2014 | de la Iglesia |
| 9,256,272 B2 | 2/2016 | Hasegawa et al. |
| 9,501,420 B2 | 11/2016 | Susarla et al. |
| 9,632,932 B1 | 4/2017 | Sutardja et al. |
| 9,798,754 B1 | 10/2017 | Shilane et al. |
| 2002/0091965 A1 | 7/2002 | Moshayedi |
| 2004/0148471 A1 | 7/2004 | Wallin et al. |
| 2004/0260883 A1 | 12/2004 | Wallin et al. |
| 2005/0278486 A1 | 12/2005 | Trika et al. |
| 2007/0006013 A1 | 1/2007 | Moshayedi et al. |
| 2007/0260811 A1 | 11/2007 | Merry et al. |
| 2009/0204853 A1 | 8/2009 | Diggs et al. |
| 2009/0210620 A1 | 8/2009 | Jibbe et al. |
| 2009/0228646 A1 | 9/2009 | Edwards et al. |
| 2010/0070703 A1 | 3/2010 | Sarkan |
| 2010/0082879 A1 | 4/2010 | McKean et al. |
| 2010/0088459 A1 | 4/2010 | Arya et al. |
| 2010/0100664 A1 | 4/2010 | Shimozono |
| 2010/0122200 A1 | 5/2010 | Merry et al. |
| 2010/0235670 A1 | 9/2010 | Keller et al. |
| 2010/0250842 A1 | 9/2010 | Deshpande et al. |
| 2010/0299547 A1 | 11/2010 | Saika |
| 2011/0029686 A1 | 2/2011 | Sethi et al. |
| 2011/0087833 A1 | 4/2011 | Jones |
| 2011/0173378 A1 | 7/2011 | Filor et al. |
| 2011/0238922 A1 | 9/2011 | Hooker et al. |
| 2012/0072698 A1 | 3/2012 | Unesaki et al. |
| 2012/0185647 A1 | 7/2012 | Dawkins |
| 2012/0221774 A1 | 8/2012 | Atkisson et al. |
| 2013/0038961 A1 | 2/2013 | Song |
| 2013/0122856 A1 | 5/2013 | Kalmbach et al. |
| 2013/0145223 A1 | 6/2013 | Okada et al. |
| 2013/0185511 A1 | 7/2013 | Sassone et al. |
| 2013/0285835 A1 | 10/2013 | Kim et al. |
| 2013/0318603 A1 | 11/2013 | Merza |
| 2014/0050002 A1 | 2/2014 | Sun |
| 2014/0052942 A1 | 2/2014 | Satou |
| 2014/0089558 A1 | 3/2014 | Baderdinni |
| 2014/0095547 A1 | 4/2014 | Guo et al. |
| 2014/0129758 A1 | 5/2014 | Okada et al. |
| 2014/0143505 A1 | 5/2014 | Sim et al. |
| 2014/0201442 A1 | 7/2014 | Rajasekaran et al. |
| 2014/0325166 A1 | 10/2014 | Iyigun et al. |
| 2015/0026403 A1 | 1/2015 | Ish et al. |
| 2015/0095567 A1 | 4/2015 | Noda |
| 2015/0206558 A1 | 7/2015 | Ni et al. |
| 2015/0278127 A1 | 10/2015 | Takakura |
| 2015/0370715 A1 | 12/2015 | Samanta et al. |
| 2016/0004459 A1 | 1/2016 | Oohira |
| 2016/0011782 A1 | 1/2016 | Kurotsuchi et al. |
| 2016/0170639 A1 | 6/2016 | Velayudhan et al. |
| 2016/0276015 A1 | 9/2016 | Bains et al. |
| 2017/0359371 A1 | 12/2017 | Merza |

OTHER PUBLICATIONS

Co-pending U.S. Appl. No. 15/145,099, filed May 3, 2016.
Co-pending U.S. Appl. No. 15/145,111, filed May 3, 2016.
Co-pending U.S. Appl. No. 15/145,878, filed May 4, 2016.
Co-pending U.S. Appl. No. 15/145,883, filed May 4, 2016.

SYSTEMS, DEVICES AND METHODS USING A SOLID STATE DEVICE AS A CACHING MEDIUM WITH A HASHING ALGORITHM TO MAINTAIN SIBLING PROXIMITY

CROSS-REFERENCE TO RELATED APPLICATIONS

This application claims the benefit of U.S. Provisional Patent Application No. 62/158,052, filed on May 7, 2015, entitled "SYSTEMS, DEVICES AND METHODS USING A SOLID STATE DEVICE AS A CACHING MEDIUM WITH A HASHING ALGORITHM TO MAINTAIN SIBLING PROXIMITY," the disclosure of which is expressly incorporated herein by reference in its entirety.

BACKGROUND

Generally caching of block device data at a relatively lower latency device provides phenomenal performance for both read and write input/output ("I/O") operations. As a read cache device, the data is stored in the cache device until it is replaced with the new data. Until then, the data is read from the cache device for subsequent read I/O operations directed to the same data block. As a write cache, the new data is written to the cache device, and the write I/O operation is informed completed. Later based on policy, the dirty data stored in the cache device is actually persisted to the underlying stable medium.

A solid state device ("SSD") can be used as the cache device. When compared to a hard disk drive, SSD devices have superior read and write performance. It is therefore desirable to maximize use of the SSD device as the cache device to achieve a greater performance advantage. In addition to having superior read and write performance, the SSD cache device typically has a larger capacity than conventional cache devices. This combination results in more complex management issues. For example, a cache medium includes a plurality of cache lines for caching data stored in the underlying data storage medium. Cache headers are provided and maintained to manage the cache lines. When servicing I/O operations, the cache headers are searched to determine whether there is a cache hit or miss. However, by maximizing use of a larger capacity cache device, more cache lines are available for caching data, and therefore more cache headers must be searched. Accordingly, the complexity of the cache header search is increased.

SUMMARY

Systems, devices and methods using an SSD as a caching medium with a hashing algorithm for maintaining sibling proximity are described herein. For example, an SSD cache device and a data structure for managing the SSD cache device are provided. Cache headers for managing the cache lines that cache corresponding data blocks stored in a same contiguous region of a physical storage capacity of an underlying data storage medium are assigned to a same bucket of the data structure, for example, using a hashing algorithm. In addition to assigning these cache headers to the same bucket of the data structure, these cache headers are maintained as a group of cache headers within the same bucket of the data structure. For example, these cache headers can be arranged sequentially within the same bucket of the data structure without cache headers for managing cache lines corresponding data blocks stored in other contiguous regions of the physical storage capacity intervening therebetween. This is referred to as maintaining sibling proximity as used herein. Optionally, multiple groups of cache headers can be arranged within the same bucket of the data structure based on time or frequency of access. For example, the group of cache headers containing a cache header for a most-recently or most-frequently accessed cache line can optionally be arranged at the head of the same bucket of the data structure.

An example computer-implemented method for managing a caching medium for a data storage system can include providing an SSD cache including a plurality of cache lines, providing a data structure including a plurality of buckets for managing the SSD cache, and providing a plurality of cache headers for managing the cache lines. Additionally, each cache line can have a first predetermined size, and each bucket can correspond to at least one contiguous region of a physical storage capacity of the data storage system having a second predetermined size. The second predetermined size can be greater than the first predetermined size. Further, each cache header can associate a cache line and a corresponding data block stored in the data storage system. The computer-implemented method can also include assigning two or more cache headers for cache lines associated with corresponding data blocks stored in a first contiguous region of the physical storage capacity to a same bucket of the data structure, and maintaining the two or more cache headers as a first group of cache headers within the same bucket of the data structure.

Optionally, the first group of cache headers can form a doubly-linked list.

Alternatively or additionally, the computer-implemented method can include maintaining a second group of cache headers within the same bucket of the data structure. The second group of cache headers can include cache headers for cache lines associated with corresponding data blocks stored in a second contiguous region of the physical storage capacity. Optionally, the first group of cache headers and the second group of cache headers can form a doubly-linked list. In addition, the computer-implemented method can include arranging the first group of cache headers and the second group of cache headers within the doubly-linked list based on a time or frequency of access. For example, the group of cache headers (e.g., the first group of cache headers or the second group of cache headers) containing a cache header for a most-recently or most-frequently accessed cache line can be arranged closer to a head of the doubly-linked list.

Alternatively or additionally, the computer-implemented method can include receiving an I/O operation directed to a data block stored in the first contiguous region of the physical storage capacity, obtaining a hash value with a hashing algorithm based on the first contiguous region of the physical storage capacity to which the I/O operation is directed, identifying the same bucket of the data structure based on the hash value, and searching the first group of cache headers within the same bucket of the data structure to determine whether the I/O operation is a cache hit or a cache miss.

Optionally, the first predetermined size can have a smaller granularity than the conventional SSD cache line size. For example, the first predetermined size can be 8 KB. As described above, the second predetermined size can be greater than the first predetermined size. For example, the second predetermined size can be 64 KB.

Optionally, an example cache header can include a logical block number, a previous pointer, a subsequent pointer and a counter.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for using an SSD cache medium with a hashing algorithm for maintaining sibling proximity, it will become evident to those skilled in the art that the implementations are not limited thereto.

Figure 1:
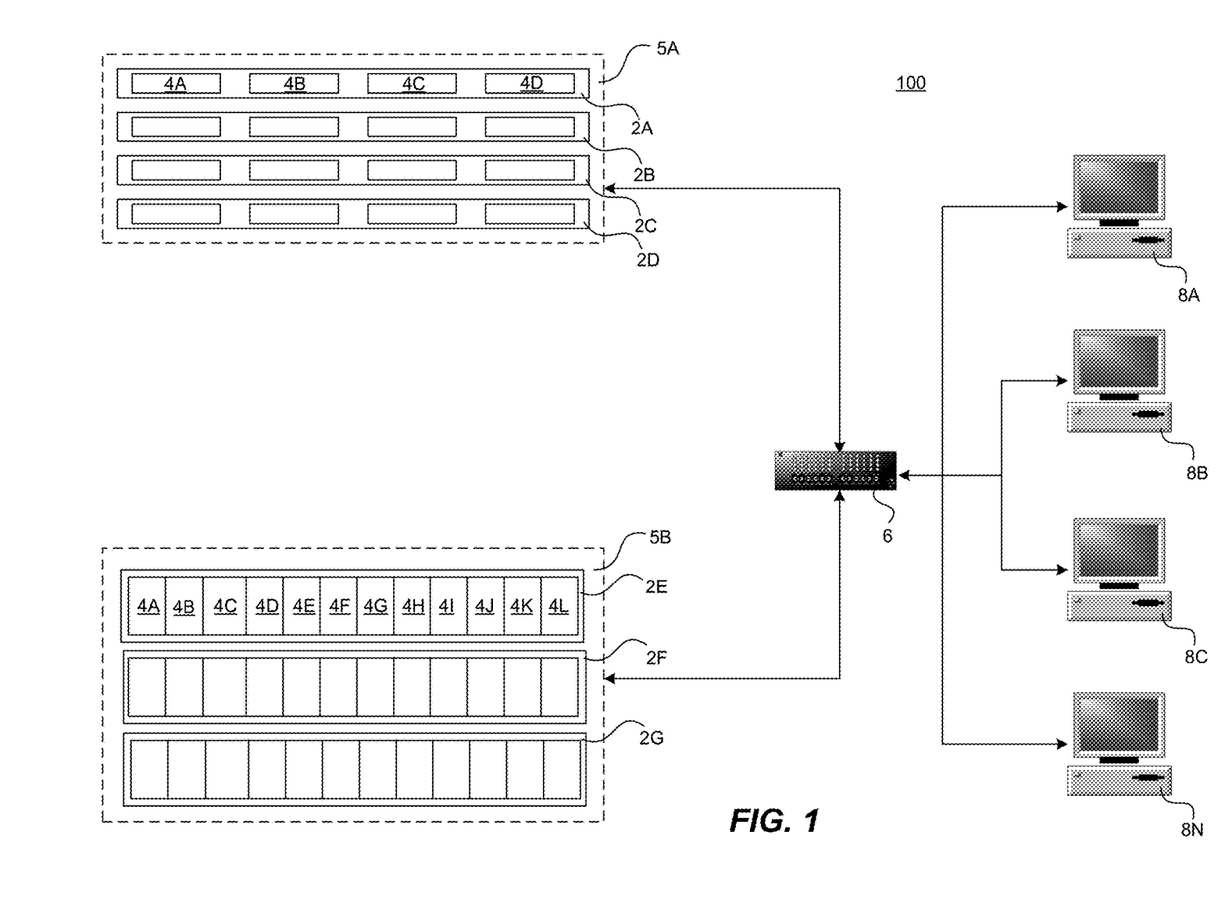
FIG. 1 is a computer architecture and network diagram showing aspects of a computer network and a storage server computer that provides an operating environment for embodiments of the disclosure presented herein.
Figure 2:
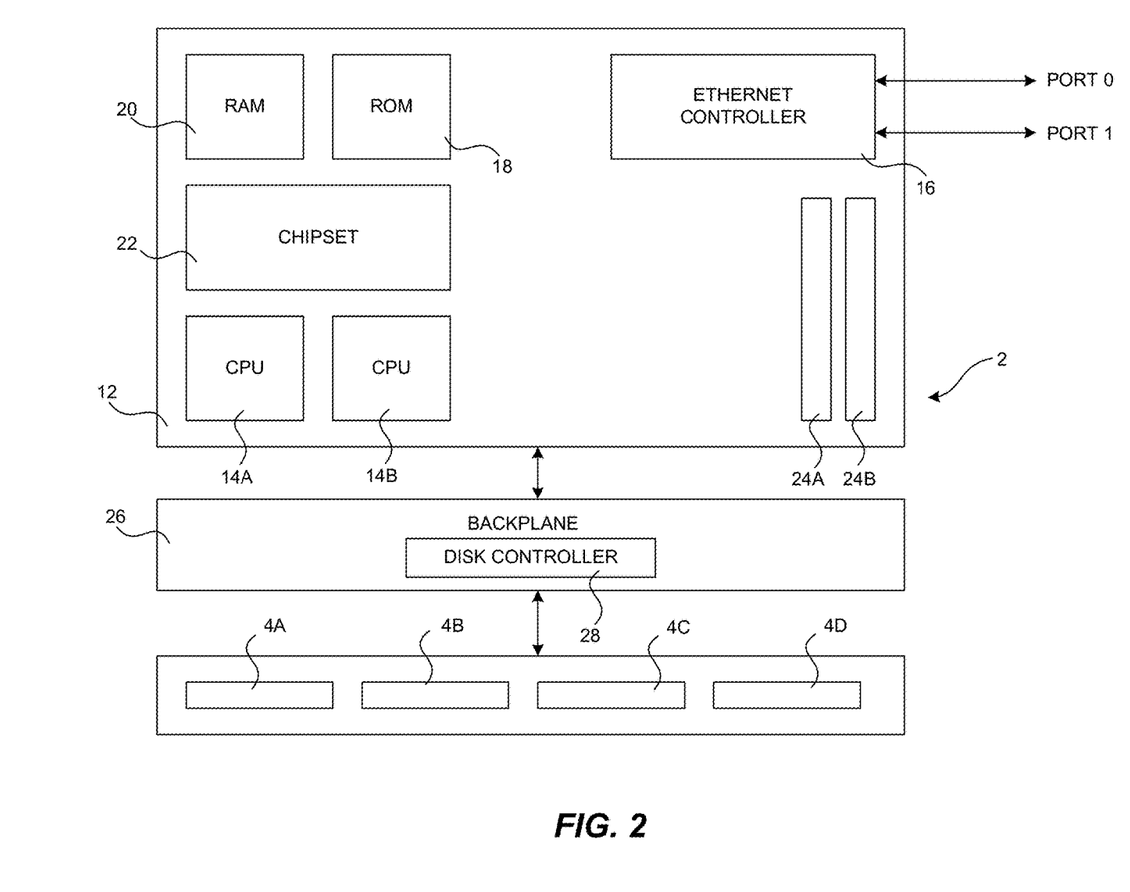
FIG. 2 is a computer architecture diagram illustrating aspects of the hardware of an illustrative storage server computer described herein.
Figure 3:
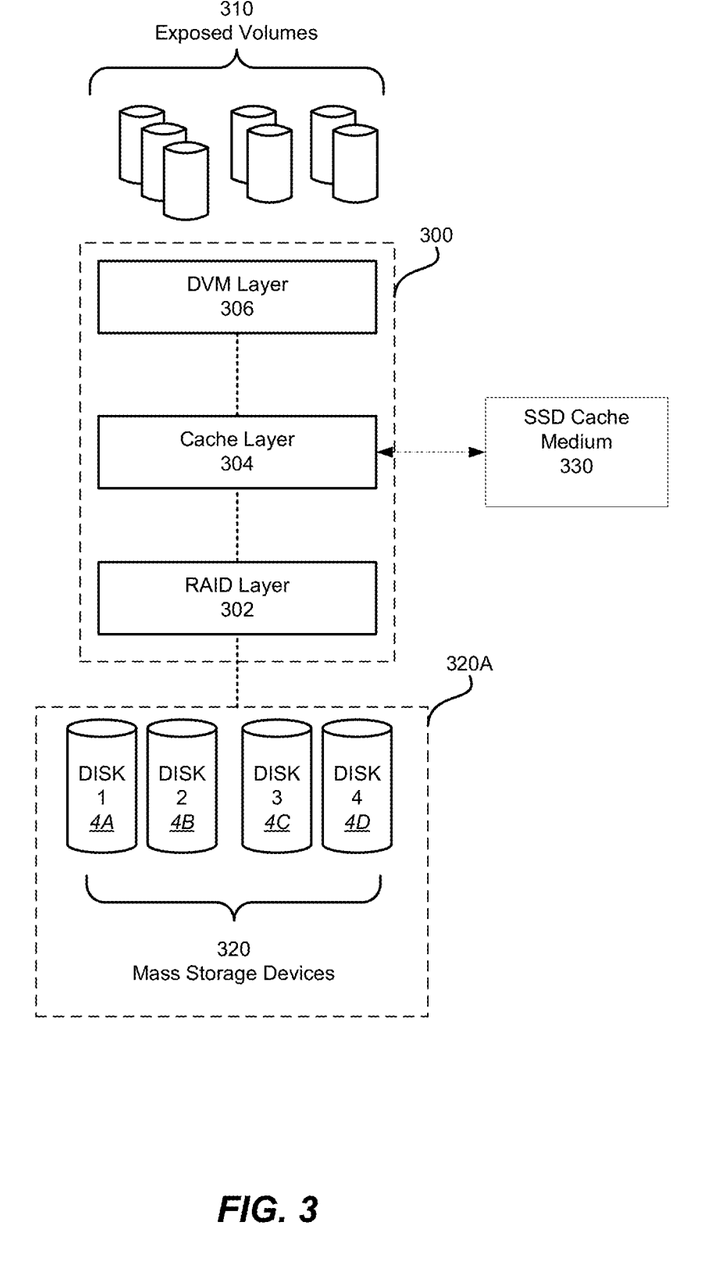
FIG. 3 is a software architecture diagram illustrating various aspects of a storage stack utilized by a storage server computer described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for using a plurality of SSDs as a caching medium for a data storage system. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Referring now to FIG. 3, an example computer software architecture for practicing the various embodiments presented herein will now be described. The computer software architecture can be implemented in a storage node 2 shown in FIGS. 1 and 2, for example. In particular, FIG. 3 illustrates a storage stack 300 used in the embodiments described herein. The storage stack 300 can include a RAID layer 302, a cache layer 304 and a distributed volume management ("DVM") layer 306. At the top of the storage stack 300, storage volumes 310 are exposed, for example, to the initiators 8A-8N shown in FIG. 1. At the bottom of the storage stack 300 are the mass storage devices 320, such as the disks 4A-4D, that are used to store the data. As discussed above, the mass storage devices are connected to a disk controller such as the disk controller 28 shown in FIG. 2. The disk controller interfaces with the mass storage devices using any standard interface such as SATA, SCSI, FC, SAS interface, etc. for physically connecting and transferring data between computers and the mass storage devices.

The RAID layer 302 abstracts the organization of the RAID array 320A and presents a logical block-level interface to higher layers in the storage stack 300. For example, the RAID layer 302 can implement RAID level 5, where data is striped across the plurality of disks (e.g., disks 4A-4D) in the RAID array 320A. In a four disk array, a RAID stripe includes data block $D_1$ stored on disk 1 (e.g., "4A"), data block $D_2$ stored on disk 2 (e.g., "4B"), data block $D_3$ stored on disk 3 (e.g., "4C") and parity block $P_A$ stored on disk 4 (e.g., "4D"), for example. The parity block $P_A$ can be computed using XOR logic of data block $D_1$, data block $D_2$ and data block $D_3$ (e.g., $P_A = D_1 \oplus D_2 \oplus D_3$). Additionally, the parity blocks in a RAID 5 array are distributed or staggered across the plurality of disks. Although RAID level 5 is discussed above, it should be understood that the RAID layer 302 can implement other RAID levels, such as RAID level 0, 1, 2, 3, 4 or 6.

The DVM layer 306 uses the block-level interface provided by the RAID layer 302 to manage the available storage capacity of the RAID array 320A and service I/O operations initiated by the initiators 8A-8N. The DVM layer 306 can implement a variety of storage management functions, such as volume virtualization, thin provisioning, snapshots, locking, data replication, etc. The DVM layer 306 can be implemented on the storage node 2 in software, hardware or a combination thereof. Volume virtualization provides the facility to create and manage multiple, logical volumes on the RAID array 320A, as well as expand a logical volume across multiple storage nodes within a storage cluster. Thin provisioning provides for the allocation of physical capacity of the RAID array 320A to logical volumes on an as-needed basis. For example, the available physical storage capacity of the RAID array 320A can be divided into a number of unique, equally-sized areas referred to as territories. Optionally, the size of a territory can be one terabyte (TB), a reduced size of 8 megabytes (MB) or any other territory size. Alternatively or additionally, the available physical storage capacity of the RAID array 320A can optionally be further subdivided into units referred to herein as provisions. The provisions can be unique, equally sized areas of the available physical capacity. For example, provisions may be 1 MB in size, a reduced size of 512 kilobytes (KB) or any other provision size. Optionally, a provision can be further subdivided into chunks. For example, the chunk size can be selected as 64 KB, a reduced size of 8 KB or any other chunk size. Snapshots provide functionality for creating and utilizing point-in-time snapshots of the contents of logical storage volumes. The locking functionality allows for synchronizing I/O operations within the storage node 2 or across nodes within the storage cluster. Data replication provides functionality for replication of data within the storage node 2 or across nodes within the storage cluster 2.

The cache layer 304 intercepts read and/or write I/O operations flowing between the RAID layer 302 and the DVM layer 306. The cache layer 304 is configured to read data from and/or write data to an SSD cache medium 330. The cache layer 304 can be implemented on the storage node 2 in software, hardware or a combination thereof. The SSD cache medium 330 can be used in either a write-through cache mode or a write-back cache mode. When the SSD cache medium 330 is controlled according to the write-through cache mode, a new read I/O operation (e.g., directed to a data block) is stored in the SSD cache 330 before returning the requested data block to the host (e.g., initiators 8A-8N of FIG. 1). Alternatively, the new read I/O operation can be performed in parallel, which decreases the response time to host. For example, once the requested data is retrieved from the mass storage devices 320, the retrieved data is stored in SSD cache medium 330 in parallel to returning the requested data block to the host. A subsequent read I/O operation requesting the read data block is retrieved from the SSD cache medium 330 instead of the mass storage devices 320. When the SSD cache medium 330 is controlled according to a write-back cache mode, a new write I/O operation (e.g., directed to a data block) is performed in the SSD cache medium 330. Then, the host (e.g., initiators 8A-8N of FIG. 1) is informed that the new write I/O operation is complete. At a later time, the data block (e.g., a dirty data block) is flushed or persisted to the mass storage devices 320 (e.g., the underlying stable medium). It should be understood that in either mode caching pairs the lower-latency SSD cache medium 330 with the mass storage devices 320. Additionally, the cache layer 304 can be configured to perform the operations for using the SSD cache medium 330 with a hashing algorithm for maintaining sibling proximity as described in further detail below.

As described above, it is desirable to maximize the use of the available storage capacity of the SSD cache device 330 due to its superior I/O performance capability as compared to that of the mass storage devices 320. An example technique to maximize use of the SSD cache device 330 is to accommodate both smaller, random I/O operations as well as larger, sequential I/O operations. For example, instead of using 64 KB cache line granularity similar to conventional SSD cache applications, a smaller SSD cache line granularity such as 8 KB, for example, can optionally be used with the techniques described herein to maximize use of the SSD cache device 330. As used herein, the SSD cache line granularity can be the first predetermined size. When using 64 KB cache line granularity, a 64 KB cache line is underutilized when less than 64 KB of data (e.g., only a 8 KB of data from a random I/O) is stored in the cache line. In other words, a portion of the storage capacity of the 64 KB cache line remains unused when only 8 KB of data is stored therein. On the other hand, when using 8 KB cache line granularity, use of the available storage capacity of the SSD cache device 330 is maximized because less storage space is underutilized. For example, the SSD cache device with 8 KB cache line granularity can accommodate smaller, random I/O operations (e.g., 8 KB of data) in a single cache line, as well as larger, sequential I/O operations (e.g., 32 KB of data) in multiple cache lines. It should be understood that 8 KB cache line granularity is provided herein only as an example of smaller SSD cache line granularity and that SSD cache line granularity more or less than 8 KB (e.g., 4 KB, 16 KB, 32 KB, etc.) can be used with to the techniques described herein.

Figure 4:
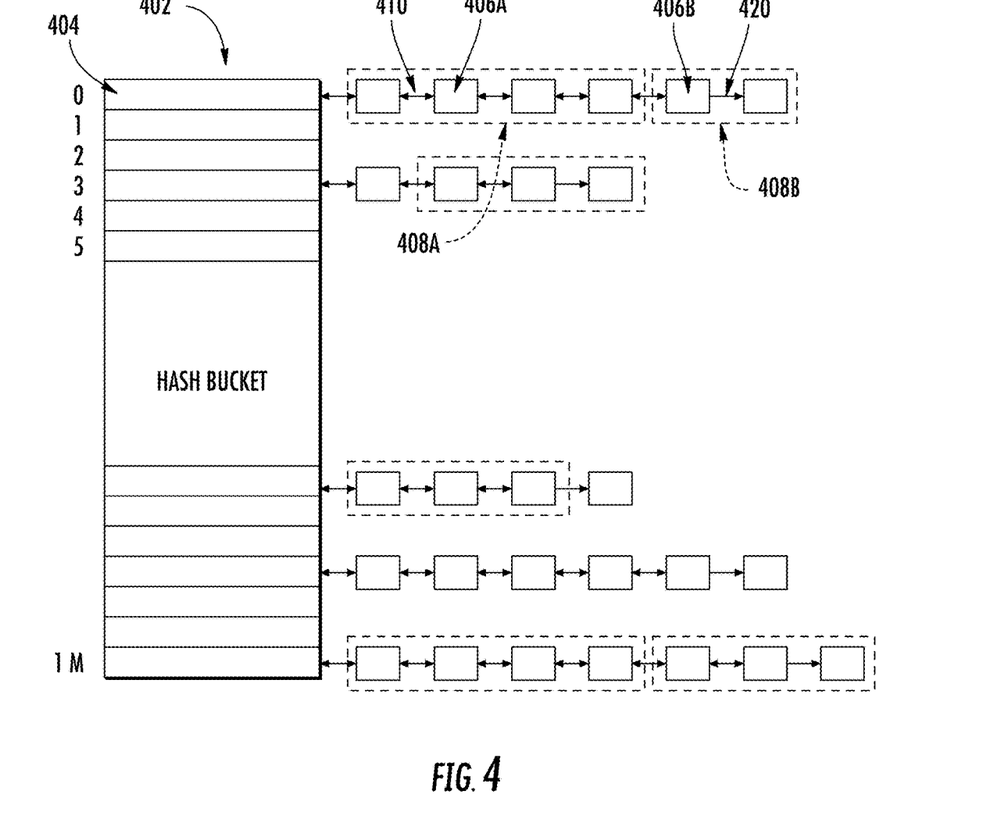
FIG. 4 is a block diagram illustrating an example data structure for managing an SSD cache as described herein.

Referring now to FIG. 4, a block diagram illustrating an example data structure 402 for managing an SSD cache (e.g., the SSD cache medium 330 of FIG. 3) is shown. The data structure 402 can be a list having a plurality of entries or buckets 404. For example, the data structure 402 can be a hash bucket list. Cache headers (e.g., cache headers 406A and 406B, collectively referred to herein as cache headers 406) can be provided for each cache line in order to manage the cache lines of the SSD cache. A cache header can be used to associate a cache line (e.g., the data stored in the cache line) with a corresponding data block stored in the underlying storage medium (e.g., the mass storage devices of FIG. 3). For example, a cache header can include an index to (or storage address of) a cache line in the SSD cache and a tag to (or storage address of) the corresponding data block stored in the underlying storage medium. As described further below, when an I/O operation is received, the cache headers 406 can be searched to determine whether the I/O operation is a cache hit or a cache miss. Optionally, a cache header can include one or more pointers such as previous or subsequent pointers to other cache headers, for example. Alternatively or additionally, a cache header can optionally include a counter for tracking a time of last access and/or a frequency of access of the cache line. As shown in FIG. 4, the cache headers 406 are assigned to the buckets 404 of the data structure 402. The cache headers 406 can be linked to other cache headers and the buckets 404 with pointers (e.g., double and single pointers 410 and 420). This disclosure contemplates that cache headers can contain more or less information or fields for managing the cache lines of the SSD cache than as described above, including any information provided in cache headers as known in the art.

As described above, SSD cache devices typically have larger capacities as compared to conventional cache devices in addition to having superior I/O performance capability. An example conventional cache device has 256 MB capacity, and with 64 KB cache line granularity, there can be a maximum of approximately 4,000 cache lines and cache headers. On the other hand, an example SSD cache device has 64 GB capacity, and with 64 KB cache line granularity, there can be a maximum of approximately 1 million cache lines and cache headers. Alternatively, with a smaller 8 KB cache granularity, there can be a maximum of approximately 8 million cache lines and cache headers. It should be understood that a 64 GB SSD cache device is provided only as an example and that SSD cache devices with more or less capacity can be used with the techniques described herein. The complexity of searching the larger number of possible cache headers for the example SSD cache device to determine whether there is a cache hit or miss therefore substantially increases as compared to searching cache headers for the example conventional cache device. Thus, techniques for managing the SSD cache medium using a hashing algorithm for maintaining sibling proximity is described below.

A hashing algorithm can be used to assign cache headers 406 to particular buckets 404 of the data structure 402. For example, a cache header can be assigned to a particular bucket of the data structure based on the location of the data block in the underlying storage medium (e.g., a contiguous region of the physical storage capacity of the underlying storage medium where the data block is stored). In other words, the hashing algorithm can return the same hash value for data blocks stored in the same contiguous region of the physical storage capacity of the underlying storage medium. Each contiguous region of the physical storage capacity can have a predetermined size such as 64 KB, for example. As used herein, the second predetermined size can be the size of each contiguous region of the physical storage capacity. In addition, the second predetermined size (e.g., 64 KB) of a contiguous region of the physical storage capacity can be greater than the first predetermined size (e.g., 8 KB) of the cache lines. It should be understood that 64 KB is provided only as an example of the second predetermined size and that the second predetermined size can be more or less than 64 KB. Using the hashing algorithm, cache headers for cache lines storing data blocks stored within the same contiguous region of the physical storage capacity can therefore be assigned to the same bucket.

The data structure 402 shown in FIG. 4 optionally includes one million buckets 404 and supports fifty-six million cache headers 406. In other words, each bucket 404 of the data structure 402 can include fifty six cache headers 406. This disclosure contemplates that the data structure 402 can include more or less buckets and/or can support more or less cache headers than as described with regard to FIG. 4, which is provided only as an example. In the data structure 402, cache headers for cache lines storing data blocks corresponding to the first 64 KB contiguous region of the physical storage capacity of the underlying storage medium can be assigned to a first bucket. Cache headers for cache lines storing data blocks corresponding to the second 64 KB contiguous region of the physical storage capacity can be assigned to a second bucket. Cache headers for cache lines storing data blocks corresponding to the third 64 KB contiguous region of the physical storage capacity can be assigned to a third bucket. Cache headers for cache lines storing data blocks corresponding to a subsequent 64 KB contiguous region of the physical storage capacity can be assigned to a subsequent bucket until the final bucket (e.g., the one-millionth bucket) is reached. Thereafter, cache headers for cache lines storing data blocks corresponding to a subsequent 64 KB contiguous region of the physical storage capacity can be assigned to the first bucket. As described further below, when the second predetermined size of a contiguous region of the physical storage capacity is 64 KB and the first predetermined size of the cache lines is 8 KB, seven groups of cache headers (e.g., a group of cache headers 408A or 408B), each including up to eight cache headers, can be assigned to each bucket 404.

In addition to assigning cache headers for cache lines to a particular bucket based on the location of the data block in the underlying storage medium, cache headers for cache lines storing data blocks stored in the same contiguous region of the physical storage capacity can be maintained as a group of cache headers within the particular bucket. In other words, the cache headers of a group of cache headers can be arranged next to each other (or sequentially) within the particular bucket. For example, as shown in FIG. 4, a first group of cache headers 408A includes a plurality of cache headers including cache header 406A. The cache headers of the first group of cache headers 408A correspond to cache lines storing data blocks stored in a same contiguous region of the physical storage capacity (e.g., a first contiguous region of the physical storage capacity), such as a 64 KB contiguous region, for example. Additionally, a second group of cache headers 408B includes a plurality of cache headers including cache header 406B. The cache headers of the second group of cache headers 408B correspond to cache lines storing data blocks stored in a different contiguous region of the physical storage capacity (e.g., a second contiguous region of the physical storage capacity), such as another 64 KB contiguous region, for example. The first and second contiguous regions of the physical storage capacity can be different contiguous regions. The hashing algorithm returns a hash value, which may be the same or different, for cache headers 406A and 406B based on the first and second contiguous regions of the physical storage capacity. In FIG. 4, the hashing algorithm returns the same hash value and cache headers 406A and 406B are assigned to the same bucket. Because the data blocks are stored in different contiguous regions of the physical storage capacity, cache headers 406A and 406B are maintained in first and second groups of cache headers 408A and 408B, respectively. It is possible to distinguish between cache headers maintained in different groups of cache headers (e.g., cache headers 406A and 406B) because each cache header contains a tag such as a logical block address ("LBA") to the corresponding data block stored in the underlying storage medium. Thus, a portion of the LBAs (e.g., a chunk index) in the cache headers for cache lines storing data from the same contiguous region of the physical storage capacity will be the same. In other words, cache headers for cache lines storing data blocks from the same contiguous region will share the same chunk index, and it is possible to distinguish between cache headers maintained in different groups of cache headers based on the chunk index. While traversing cache headers in a particular bucket of the data structure, it is possible to determine the end of one cache header group (e.g., the first group of cache headers 408A) and the beginning of another cache header group (e.g., the second group of cache headers 408B) based on the chunk index. When a contiguous region of the storage capacity is 64 KB (e.g., the second predetermined size) and a cache line is 8 KB (e.g., the first predetermined size), each group of cache headers can include eight cache headers. For example, the data blocks stored in any 64 KB contiguous region of the physical storage capacity can be cached in eight cache lines with 8 KB cache line granularity. Thus, eight cache headers would be needed to manage the eight cache lines.

An example technique for maintaining cache headers as a group of cache headers is to form a doubly-linked list. The cache headers belonging to a group of cache headers can be maintained together or sequentially within the doubly-linked list, for example, without a cache header belonging to another group of cache headers intervening therebetween. In a doubly-linked list, each cache header (with the exception of the last cache header) includes a previous pointer to a previous cache header and a subsequent cache header to a subsequent cache header in the doubly-linked list. This is shown as double pointer 410 in FIG. 4. The last cache header in the doubly-linked list includes a previous pointer to a previous cache header and a null pointer, for example. This is shown as single pointer 420 in FIG. 4. Because each of the cache headers includes previous and subsequent pointers, it is possible to traverse the doubly-linked list in either direction (e.g., forward and/or reverse directions). Additionally, a doubly-linked list facilitates insertion and/or removal of cache headers by modifying the previous and subsequent pointers of the effected cache headers.

The complexity of searching cache headers to determine whether there is a cache hit or miss is decreased when cache headers for cache lines storing data blocks stored in a same contiguous region of the physical storage capacity are maintained as a group of cache headers within a particular bucket. For example, when an I/O operation directed to an 8 KB data block (e.g., a random I/O operation or a portion of a sequential I/O operation) in the underlying storage medium is received, a hash value can be obtained using a hashing algorithm based on a 64 KB contiguous region of the underlying storage medium in which the 8 KB data block is stored. As described above, the hash value can be used to identify a particular bucket of the data structure 402 shown in FIG. 4. For example, if the I/O operation is directed to a first contiguous region, the hash value corresponds to bucket "0," and the search can be limited to the cache headers within bucket "0." Additionally, because the I/O operation is directed to the first contiguous region, the search can be further limited to a group of cache headers associated with cache lines storing corresponding data blocks stored in the first contiguous region (e.g., the first group of cache headers 408A). As discussed above, it is possible to distinguish between groups of cache headers, for example, using a chunk index, which is a portion of the LBA shared by cache headers for cache lines storing data blocks from the same contiguous region of the underlying physical storage medium. In FIG. 4, the search is further limited to four cache headers included in the first group of cache headers 408A, which are maintained together or sequentially. Therefore, instead of requiring search of all of the cache headers in bucket "0," the cache headers in the first group of cache headers 408A are searched. The determination of cache hit or miss can be made after searching the four cache headers of the first group of cache headers 408A. Additionally, for sequential I/O operations (e.g., directed to data blocks greater than a single cache line), searching for the first cache header in the group of cache headers, instead of searching for multiple cache headers, can automatically identify other cache headers for cache lines that are part of the sequential I/O operation because the cache headers are grouped together or sequentially.

By assigning cache headers associated with cache lines storing corresponding data blocks stored in the same contiguous region to the same bucket, it is possible to avoid the scenario where these cache headers (e.g., eight cache headers in the above example) are assigned to different buckets, which increases the complexity of the search because cache headers in multiple buckets must be searched to determine whether there is a cache hit or miss. Further, by maintaining these cache headers as a group of cache headers (e.g., maintaining sibling proximity) within the same bucket, it is possible to avoid the scenario where these cache headers are distributed in different locations within the same bucket, which increases the complexity of the search because all of the cache headers in the same bucket must be searched to determine whether there is a cache hit or miss.

Alternatively or additionally, the groups of cache headers within the same bucket can optionally be sorted based on a time of access. For example, with regard to FIG. 4, the first group of cache headers 408A and the second group of cache headers 408B can be arranged in the bucket 404 based on the time of last access. The group of cache headers containing the cache header for the most-recently accessed cache line can be arranged at a head of the doubly-linked list. The group of cache headers containing the cache header for the least-recently accessed cache line can be arranged at a tail of the doubly-linked list. Additionally, one or more groups of cache headers between the groups of cache headers at the head and tail of the doubly-linked list, respectively, can be sorted based on access time. For example, in FIG. 4, cache header 406A is accessed more recently than cache header 406B, and therefore, the first group of cache headers 408A is arranged near the head of the doubly-linked list and the second group of cache headers 408B is arranged near the tail of the doubly-linked list. This disclosure contemplates that the time of last access can be tracked by a counter included in the cache headers. The counters in the cache headers can be used to sort the groups of cache headers within the doubly-linked list. Accordingly, this sorting ensures that searches for cache headers for more recently-accessed cache lines are returned faster.

Alternatively, the groups of cache headers within the same bucket can optionally be sorted based on a frequency of access. For example, with regard to FIG. 4, the first group of cache headers 408A and the second group of cache headers 408B can be arranged in the bucket 404 based on the frequency of access. The group of cache headers containing the cache header for the most-frequently accessed cache line can be arranged at a head of the doubly-linked list. The group of cache headers containing the cache header for the least-frequently accessed cache line can be arranged at a tail of the doubly-linked list. Additionally, one or more groups of cache headers between the groups of cache headers at the head and tail of the doubly-linked list, respectively, can be sorted based on frequency of access. For example, in FIG. 4, cache header 406A is accessed more frequently than cache header 406B, and therefore, the first group of cache headers 408A is arranged near the head of the doubly-linked list and the second group of cache headers 408B is arranged near the tail of the doubly-linked list. This disclosure contemplates that the frequency of access can be tracked by a counter included in the cache headers. The counters in the cache headers can be used to sort the groups of cache headers within the doubly-linked list. Accordingly, this sorting ensures that searches for cache headers for more frequently-accessed cache lines are returned faster.

Figure 5A:
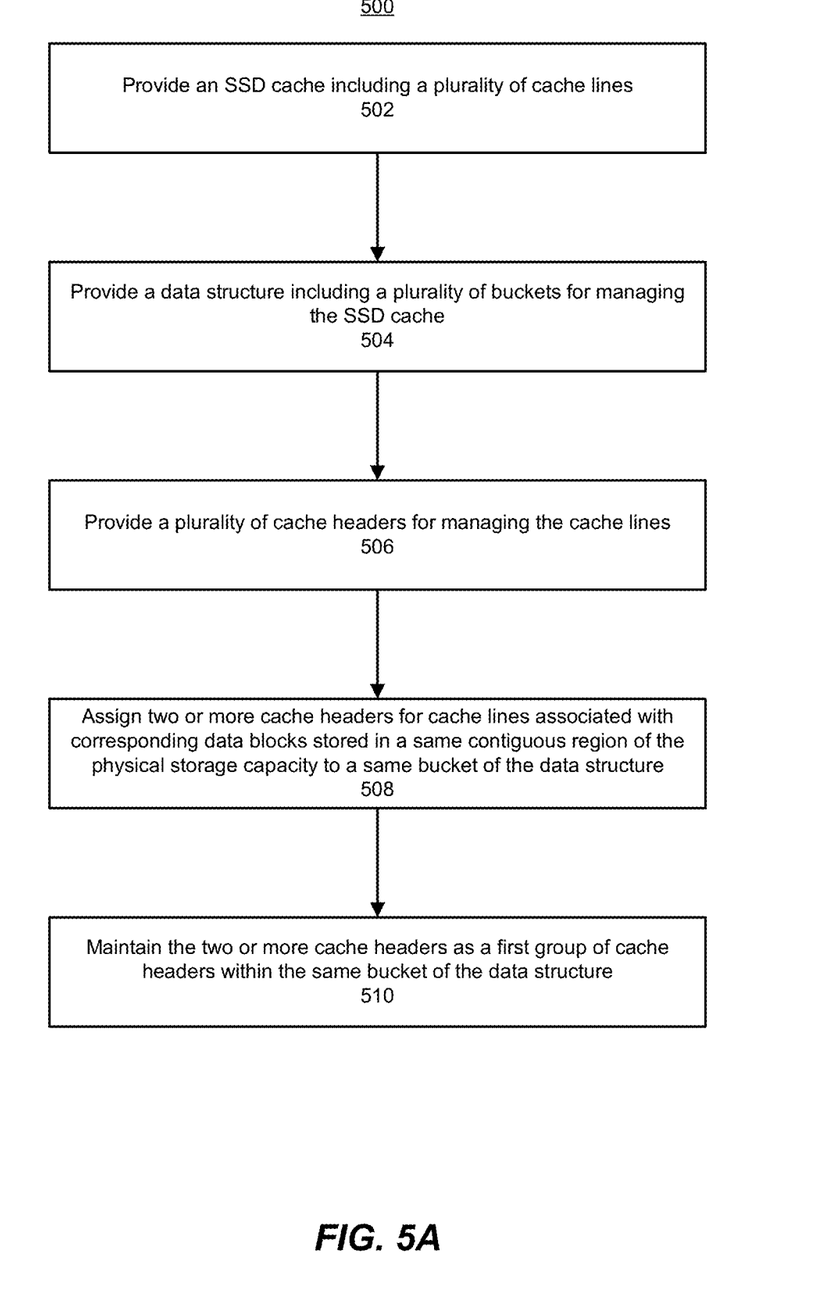
FIG. 5A is a flow diagram illustrating example operations for managing a caching medium for a data storage system as described herein.
Figure 5B:
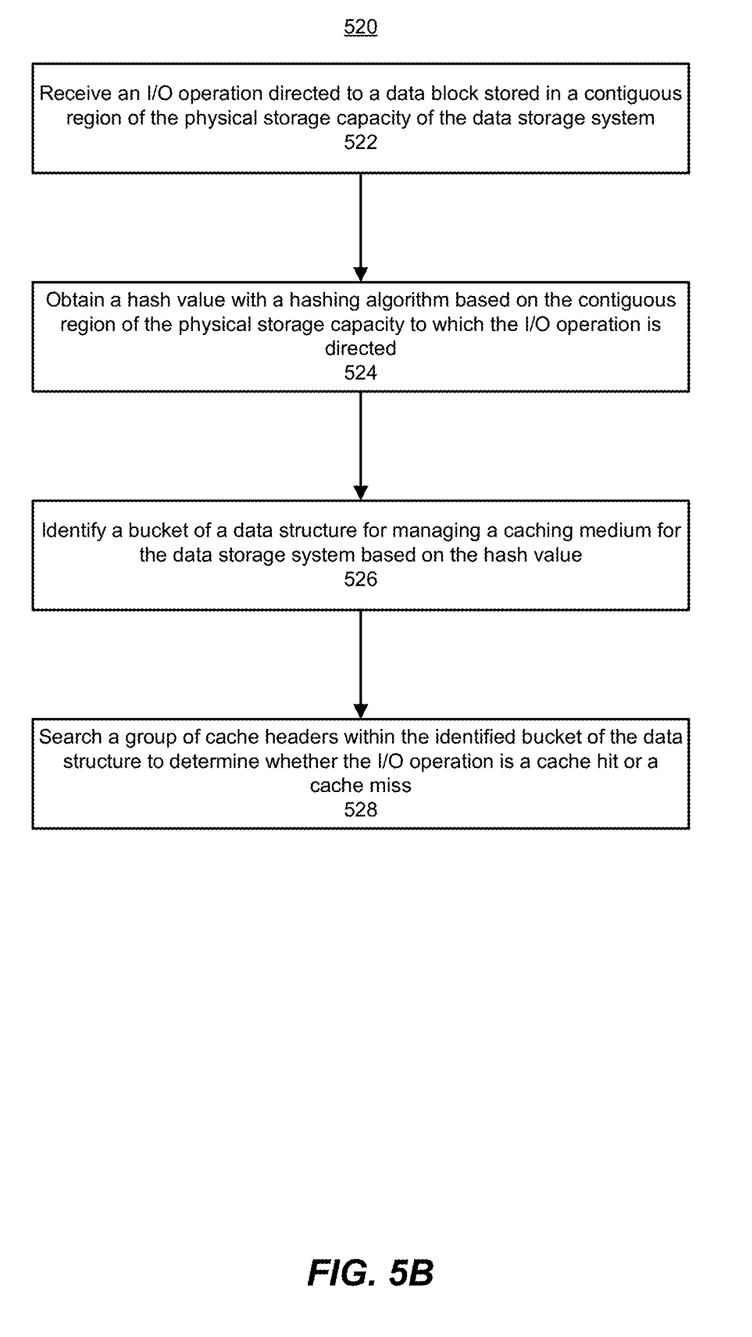
FIG. 5B is another flow diagram illustrating example operations for managing a caching medium for a data storage system as described herein.

Referring now to FIGS. 5A-5B, flow diagrams illustrating example operations for managing a caching medium for a data storage system are shown. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5A is a flow diagram illustrating example operations 500 for managing a caching medium for a data storage system. At 502, an SSD cache including a plurality of cache lines is provided. As described above, each cache line can have a first predetermined size such as 8 KB, for example. At 504, a data structure including a plurality of buckets for managing the SSD cache is provided. As described above, each bucket can correspond to at least one contiguous region of a physical storage capacity of the data storage system having a second predetermined size such as 64 KB, for example. Accordingly, the second predetermined size is greater than the first predetermined size. At 506, a plurality of cache headers for managing the cache lines are provided. As described in detail above, each cache header associates a cache line and a corresponding data block stored in the data storage system. At 508, two or more cache headers for cache lines associated with corresponding data blocks stored in a same contiguous region of the physical storage capacity are assigned to a same bucket of the data structure. At 510, the two or more cache headers are maintained as a first group of cache headers within the same bucket of the data structure.

FIG. 5B is a flow diagram illustrating example operations 520 for performing a search of cache headers. At 522, an I/O operation directed to a data block stored in a contiguous region of the physical storage capacity of the data storage system is received. At 524, a hash value is obtained with a hashing algorithm based on the contiguous region of the physical storage capacity to which the I/O operation is directed. At 526, a bucket of the data structure (e.g., the data structure described with regard to FIG. 4) is identified based on the hash value. Then, at 528, a group of cache headers within the identified bucket of the data structure are searched to determine whether the I/O operation is a cache hit or a cache miss. As described above, the group of cache headers includes two or more cache headers for cache lines associated with corresponding data blocks stored in the contiguous region of the physical storage capacity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for managing a caching medium for a data storage system, comprising:
   providing an SSD cache including a plurality of cache lines, each cache line having a first predetermined size;

providing a data structure including a plurality of buckets for managing the SSD cache, each bucket corresponding to at least one contiguous region of a physical storage capacity of the data storage system, the at least one contiguous region of the physical storage capacity having a second predetermined size that is greater than the first predetermined size;

providing a plurality of cache headers for managing the cache lines, each cache header associating a cache line and a corresponding data block stored in the data storage system;

assigning two or more cache headers to a same bucket of the data structure, the two or more cache headers being cache headers for cache lines associated with corresponding data blocks stored in a first contiguous region of the physical storage capacity;

maintaining the two or more cache headers as a first group of cache headers within the same bucket of the data structure;

receiving an I/O operation directed to a data block stored in the first contiguous region of the physical storage capacity;

obtaining a hash value with a hashing algorithm based on the first contiguous region of the physical storage capacity to which the I/O operation is directed;

identifying the same bucket of the data structure based on the hash value; and searching the first group of cache headers within the same bucket of the data structure to determine whether the I/O operation is a cache hit or a cache miss.

2. The computer-implemented method of claim 1, wherein the first group of cache headers forms a doubly-linked list.

3. The computer-implemented method of claim 1, further comprising maintaining a second group of cache headers within the same bucket of the data structure, the second group of cache headers including cache headers for cache lines associated with corresponding data blocks stored in a second contiguous region of the physical storage capacity.

4. The computer-implemented method of claim 3, wherein the first group of cache headers and the second group of cache headers form a doubly-linked list.

5. The computer-implemented method of claim 4, further comprising arranging the first group of cache headers and the second group of cache headers within the doubly-linked list based on a time or frequency of access.

6. The computer-implemented method of claim 5, wherein the first group of cache headers or the second group of cache headers containing a cache header for a most-recently or most-frequently accessed cache line is arranged closer to a head of the doubly-linked list.

7. The computer-implemented method of claim 1, wherein the first predetermined size is 8 KB and the second predetermined size is 64 KB.

8. The computer-implemented method of claim 1, wherein at least one of the cache headers comprises a logical block number, a previous pointer, a subsequent pointer and a counter.

9. A non-transitory computer-readable storage medium having computer-executable instructions stored thereon for managing a caching medium for a data storage system that, when executed by a data storage system computer, cause the data storage system computer to:

provide an SSD cache including a plurality of cache lines, each cache line having a first predetermined size;

provide a data structure including a plurality of buckets for managing the SSD cache, each bucket corresponding to at least one contiguous region of a physical storage capacity of the data storage system, the at least one contiguous region of the physical storage capacity having a second predetermined size that is greater than the first predetermined size;

provide a plurality of cache headers for managing the cache lines, each cache header associating a cache line and a corresponding data block stored in the data storage system;

assign two or more cache headers to a same bucket of the data structure, the two or more cache headers being cache headers for cache lines associated with corresponding data blocks stored in a first contiguous region of the physical storage capacity;

maintain the two or more cache headers as a first group of cache headers within the same bucket of the data structure;

receive an I/O operation directed to a data block stored in the first contiguous region of the physical storage capacity;

obtain a hash value with a hashing algorithm based on the first contiguous region of the physical storage capacity to which the I/O operation is directed;

identify the same bucket of the data structure based on the hash value; and search the first group of cache headers within the same bucket of the data structure to determine whether the I/O operation is a cache hit or a cache miss.

10. The non-transitory computer-readable storage medium of claim 9, having further computer-executable instructions stored thereon that, when executed by the data storage system computer, cause the data storage system computer to maintain a second group of cache headers within the same bucket of the data structure, the second group of cache headers including cache headers for cache lines associated with corresponding data blocks stored in a second contiguous region of the physical storage capacity.

11. The non-transitory computer-readable storage medium of claim 10, wherein the first group of cache headers and the second group of cache headers form a doubly-linked list.

12. The non-transitory computer-readable storage medium of claim 11, having further computer-executable instructions stored thereon that, when executed by the data storage system computer, cause the data storage system computer to arrange the first group of cache headers and the second group of cache headers within the doubly-linked list based on a time or frequency of access.

13. The non-transitory computer-readable storage medium of claim 12, wherein the first group of cache headers or the second group of cache headers containing a cache header for a most-recently or most-frequently accessed cache line is arranged closer to a head of the doubly-linked list.

14. A data storage system, comprising:

a plurality of disks providing a physical storage capacity of the data storage system;

an SSD cache providing a caching medium for the data storage system, the SSD cache including a plurality of cache lines, each cache line having a first predetermined size;

a data storage system computer comprising a processor and a memory in communication with the processor, the memory having computer-executable instructions stored thereon that, when executed by the processor, cause the data storage system computer to:

provide a data structure including a plurality of buckets for managing the SSD cache, each bucket corresponding to at least one contiguous region of the physical storage capacity, the at least one contiguous region of the physical storage capacity having a second predetermined size that is greater than the first predetermined size;

provide a plurality of cache headers for managing the cache lines, each cache header associating a cache line and a corresponding data block stored in the data storage system;

assign two or more cache headers to a same bucket of the data structure, the two or more cache headers being cache headers for cache lines associated with corresponding data blocks stored in a first contiguous region of the physical storage capacity; and maintain the two or more cache headers as a first group of cache headers within the same bucket of the data structure;

receive an I/O operation directed to a data block stored in the first contiguous region of the physical storage capacity;

obtain a hash value with a hashing algorithm based on the first contiguous region of the physical storage capacity to which the I/O operation is directed;

identify the same bucket of the data structure based on the hash value; and search the first group of cache headers within the same bucket of the data structure to determine whether the I/O operation is a cache hit or a cache miss.

15. The data storage system of claim 14, wherein the memory has further computer-executable instructions stored thereon that, when executed by the processor, cause the data storage system computer to maintain a second group of cache headers within the same bucket of the data structure, the second group of cache headers including cache headers for cache lines associated with corresponding data blocks stored in a second contiguous region of the physical storage capacity.

16. The data storage system of claim 15, wherein the first group of cache headers and the second group of cache headers form a doubly-linked list.

17. The data storage system of claim 16, wherein the memory has further computer-executable instructions stored thereon that, when executed by the processor, cause the data storage system computer to arrange the first group of cache headers and the second group of cache headers within the doubly-linked list based on a time of last access.

* * * * *